United States Patent
Ishitsuka

(10) Patent No.: US 8,046,099 B2
(45) Date of Patent: Oct. 25, 2011

(54) LIBRARY UNIT AND MAGAZINE POSITION DETECTING METHOD IN THE LIBRARY UNIT

(75) Inventor: Tadashi Ishitsuka, Tokyo (JP)

(73) Assignee: NEC Corporation, Tokyo (JP)

( * ) Notice: Subject to any disclaimer, the term of this patent is extended or adjusted under 35 U.S.C. 154(b) by 1244 days.

(21) Appl. No.: 11/730,032

(22) Filed: Mar. 29, 2007

(65) Prior Publication Data
US 2007/0233315 A1  Oct. 4, 2007

(30) Foreign Application Priority Data
Mar. 31, 2006  (JP) ................................. 2006-098189

(51) Int. Cl.
*G06F 7/00* (2006.01)
(52) U.S. Cl. ...................................................... 700/214
(58) Field of Classification Search ............... 360/73.03, 360/69, 75.11; 700/214
See application file for complete search history.

(56) References Cited

U.S. PATENT DOCUMENTS

| 5,661,287 | A | * | 8/1997 | Schaefer et al. | 235/383 |
|---|---|---|---|---|---|
| 5,841,743 | A | * | 11/1998 | Kobayashi et al. | 369/30.3 |
| 5,959,866 | A | * | 9/1999 | Hanaoka et al. | 700/214 |
| 6,396,327 | B1 | * | 5/2002 | Lam | 327/317 |
| 6,398,327 | B1 | * | 6/2002 | Momoze | 312/319.1 |
| 7,480,111 | B2 | * | 1/2009 | Ikeuchi et al. | 360/69 |
| 2002/0044776 | A1 | * | 4/2002 | Miyazaki et al. | 396/406 |
| 2002/0105749 | A1 | * | 8/2002 | Hirooka et al. | 360/69 |
| 2002/0153815 | A1 | | 10/2002 | Chaloner et al. | |
| 2007/0058285 | A1 | * | 3/2007 | Tanaka | 360/92 |

FOREIGN PATENT DOCUMENTS

JP   4-319564      11/1992
JP   2003-6966 A   1/2003

OTHER PUBLICATIONS

Japanese Office Action dated Nov. 11, 2008 with partial English-Language Translation.

* cited by examiner

*Primary Examiner* — Ramya Prakasam
(74) *Attorney, Agent, or Firm* — McGinn IP Law Group, PLLC

(57) ABSTRACT

A library unit of the present invention includes a magazine, a cartridge, at least one sensor and an accessor. The cartridge is loaded in the magazine and arranged in a direction in which the magazine is loaded to or unloaded from the library unit. The sensor is provided for the library unit and activated to make an output, when the magazine is pulled out to a predetermined position, whether or not the magazine is positioned facing the sensor. The accessor identifies a position of the magazine according to an output of the sensor and receives the cartridge.

36 Claims, 9 Drawing Sheets

|  | A | B | C | D |
|---|---|---|---|---|
| STATUS 1 | CELL 111 | CELL 112 | CELL 113 | CELL 114 |
| STATUS 2 | CELL 112 | CELL 113 | CELL 114 |  |
| STATUS 3 | CELL 113 | CELL 114 |  |  |
| STATUS 4 | CELL 114 |  |  |  |

| SENSOR 321 | SENSOR 322 | SENSOR 323 | SENSOR 324 | MAGAZINE POSITION STATUS |
|---|---|---|---|---|
| ON | ON | ON | ON | STATUS 1 |
| ON | ON | ON | OFF | STATUS 2 |
| ON | ON | OFF | OFF | STATUS 3 |
| ON | OFF | OFF | OFF | STATUS 4 |

FIG. 7A

STATUS 1

| | 700 | 701 | 702 | 122 |
|---|---|---|---|---|
| CELL 114 | ID INFORMATION 201A | ADDRESS 1 |
| CELL 113 | | ADDRESS 2 |
| CELL 112 | | ADDRESS 3 |
| CELL 111 | ID INFORMATION 200A | ADDRESS 4 |
| DRIVE 130 | | ADDRESS 5 |

FIG. 7B

STATUS 2

| | 700 | 701 | 702 | 122 |
|---|---|---|---|---|
| CELL 114 | ID INFORMATION 201A | ADDRESS 2 |
| CELL 113 | | ADDRESS 3 |
| CELL 112 | | ADDRESS 4 |
| CELL 111 | ID INFORMATION 200A | |
| DRIVE 130 | | ADDRESS 5 |

FIG. 7C

STATUS 3

| | 700 | 701 | 702 | 122 |
|---|---|---|---|---|
| CELL 114 | ID INFORMATION 201A | ADDRESS 3 |
| CELL 113 | | ADDRESS 4 |
| CELL 112 | | |
| CELL 111 | ID INFORMATION 200A | |
| DRIVE 130 | | ADDRESS 5 |

FIG. 7D

STATUS 4

| | 700 | 701 | 702 | 122 |
|---|---|---|---|---|
| CELL 114 | ID INFORMATION 201A | ADDRESS 4 |
| CELL 113 | | |
| CELL 112 | | |
| CELL 111 | ID INFORMATION 200A | |
| DRIVE 130 | | ADDRESS 5 |

FIG. 8A

| | 700 | 701 | 702 | 122 |
|---|---|---|---|---|
| CELL 114 | | ADDRESS 1 |
| CELL 113 | ID INFORMATION 201A | ADDRESS 2 |
| CELL 112 | | ADDRESS 3 |
| CELL 111 | ID INFORMATION 200A | ADDRESS 4 |
| DRIVE 130 | | ADDRESS 5 |

FIG. 8B

| | 700 | 701 | 702 | 122 |
|---|---|---|---|---|
| CELL 114 | ID INFORMATION 201A | ADDRESS 1 |
| CELL 113 | | ADDRESS 2 |
| CELL 112 | | ADDRESS 3 |
| CELL 111 | | ADDRESS 4 |
| DRIVE 130 | ID INFORMATION 200A | ADDRESS 5 |

| FLUCTUATION NUMBER OF ON SENSORS | FLUCTUATION NUMBER OF OFF SENSORS | ADDRESS TRANSLATION |
|---|---|---|
| 0 | 0 | NO TRANSLATION (ADDRESS n→ADDRESS n) |
| −1 | +1 | ADDRESS n→ADDRESS n+1 |
| −2 | +2 | ADDRESS n→ADDRESS n+2 |
| −3 | +3 | ADDRESS n→ADDRESS n+3 |

901  902  903  900

LIBRARY UNIT AND MAGAZINE POSITION DETECTING METHOD IN THE LIBRARY UNIT

BACKGROUND OF THE INVENTION

The present invention relates to a library unit and a magazine position detecting method in the library unit, and more particularly to a library unit in which an accessor can access any cell of a magazine left in the library unit by detecting the position of the magazine which is pulled out halfway, as well as a magazine position detecting method in the library unit.

There have been proposed various types of methods for positioning a transferring mechanism in a magnetic tape library unit so far.

For example, Japanese Unexamined Patent Publication No. Hei04(1992)-319564 (patent document 1) discloses one of such methods. According to the method, a reflection sensor attached to a medium transferring mechanism (accessor) detects an end or reading mechanism of a cell which loads a medium (tape cartridge). A flag sensor provided for the accessor detects a reference pattern on the flag provided in parallel to a spline for guiding the accessor. The intervals of pulses output from both reflection sensor and flag sensor is measured with use of output pulses of an encoder. The output pulses of the encoder indicate the number of rotations of a motor for driving the accessor. The measuring result is stored in a memory. And during normal positioning, the position at which the motor stops is controlled according to the positional data of the cell read from the memory.

FIG. 11 shows a block diagram of a large capacity external storage unit (magnetic tape library unit) 1100 disclosed in the patent document 1.

The library unit 1100 includes plural cells 1120 for loading plural media 1110; plural reading or writing mechanisms (magnetic tape drives) (not shown) for writing data to or reading data from the plural magnetic tape cartridges; an accessor 1130 for storing each tape cartridge 1110 in or taking out it from each cell 1120 and each magnetic tape drive; a spline 1140 for guiding the accessor 1130; a motor 1150 for driving the accessor 1130; a positioning reference flag 1160 provided in parallel to the spline 1140; a flag sensor 1170 for reading a reference pattern on the flag 1160; and an encoder 1180 for outputting the number of pulses proportionally to the number of rotations of the motor 1150. In another aspect of the invention, the library unit further includes a reflection sensor 1190 attached to the accessor 1130 and used to detect an end surface of each cell 1120; a counter 1101 for counting output pulses of the encoder 1180 while the accessor 1130 is moving; a non-volatile memory 1102 for storing the count of the counter 1101 in relation to the position of each cell 1120; computing means (computer) 1103 for computing a difference between the data in the memory 1102 and a predetermined reference value to control the accessor 1130 by controlling the motor 1150.

In the magnetic tape library unit 1100, the counter 1101 counts the number of pulses outputted from the encoder 1180 between when the end surface of a cell is detected by the reflection sensor 1190 and when the reference pattern is detected by the flag sensor 1170 at the time of periodical inspection. The count value is stored at an address in the memory 1102 corresponding to the position of the cell 1120.

When the accessor 1130 moves and the flag sensor 1170 detects the positioning reference pattern of the flag 1160, the computer 1103 reads the target cell position data from the memory 1102 to compute a difference from the reference value. The difference indicates a relative deviation between the flag 1160 and the target cell 1120 or between the flag 1160 and the target magnetic tape drive. The computer 1103 corrects a predetermined value according to the result of the computing. Then, the computer 1103 controls the motor 1140 so as to stop at a position where the number of pulses outputted from the encoder 1180 matches with the corrected value.

Consequently, because such a relative positional deviation can be corrected in the library unit 1100 disclosed in the patent document 1, the accessor 1130 can be controlled accurately in positioning.

SUMMARY OF THE INVENTION

In the case of the related library unit, when all the cells (magazines) are set completely in the library unit, the accessor can be controlled accurately in positioning. If a magazine is pulled out halfway, however, it is not possible to identify where the magazine will stop and the accessor cannot access a cartridge in the magazine. This has been a problem.

An object of the present invention is to provide a library unit and a magazine position detecting method in the library unit which enables its accessor to access cells in a magazine pulled out halfway and left in the library unit by detecting the position of the magazine.

According to one aspect of the present invention, the library unit is provided which includes a magazine loaded in the library unit, a cartridge which is loaded in the magazine and arranged in a direction in which the magazine is loaded or unloaded, at least one sensor provided for the library unit and activated to make an output, when the magazine is pulled out to a predetermined position, whether or not the magazine is positioned facing the sensor, and an accessor which identifies a position of the magazine according to an output of the sensor and which receives the cartridge.

According to another aspect of the present invention, a magazine position detecting method in the library unit which has a magazine loaded, a cartridge, which is loaded in the magazine and arranged in a direction in which the magazine is loaded/unloaded, at least one sensor, and an accessor for receiving the cartridge, concludes making an output of whether or not the magazine is positioned to face the sensor by activating a output of the sensor when the magazine is pulled out to a predetermined position and identifying a position of the magazine according to the output of the sensor to access the cartridge.

BRIEF DESCRIPTION OF THE DRAWINGS

Other features and advantages of the invention will be made more apparent by the following detailed description and the accompanying drawings, wherein:

FIGS. 6A and 6B shows position information of the magazine and status information of the sensors shown in FIGS. 5A through 5D;

FIGS. 7A through 7D show contents of the magnetic tape information table shown in FIGS. 5A through 5D;

FIGS. 8A and 8B show contents of the magnetic tape information table shown in FIGS. 5A through 5D when a cartridge is moved;

In the drawings, the same reference numerals represent the same structural elements.

DETAILED DESCRIPTION OF THE PREFERRED EMBODIMENTS

At first, a first exemplary embodiment of the present invention will be described in detail below.

Figure 1A:
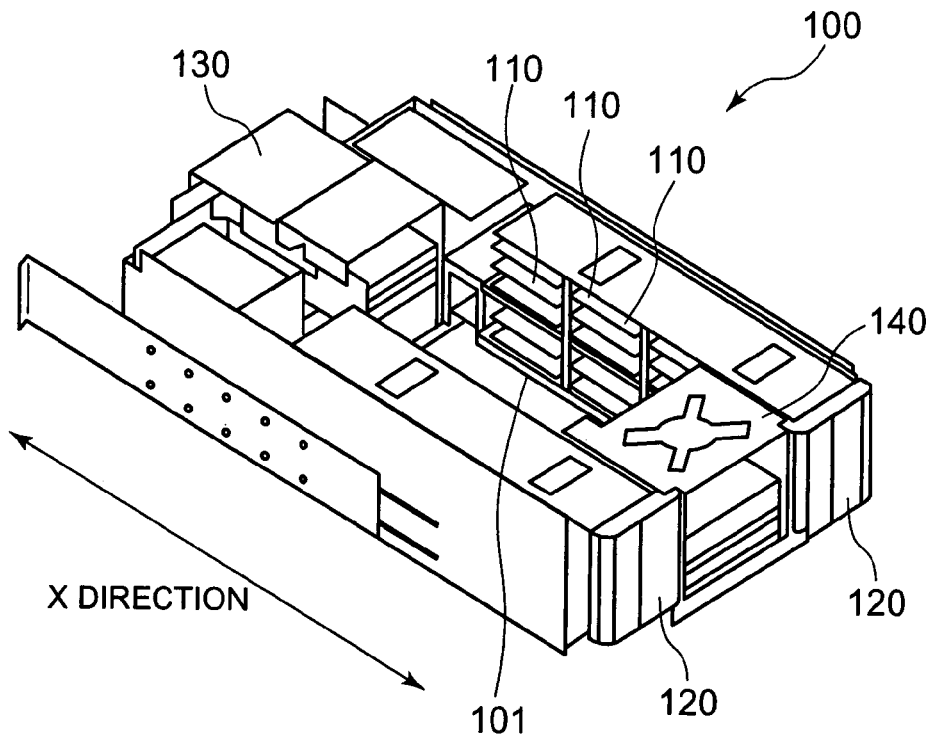
FIG. 1A is a schematic perspective view of a magnetic tape library unit in first and second exemplary embodiments of the present invention.
Figure 1B:
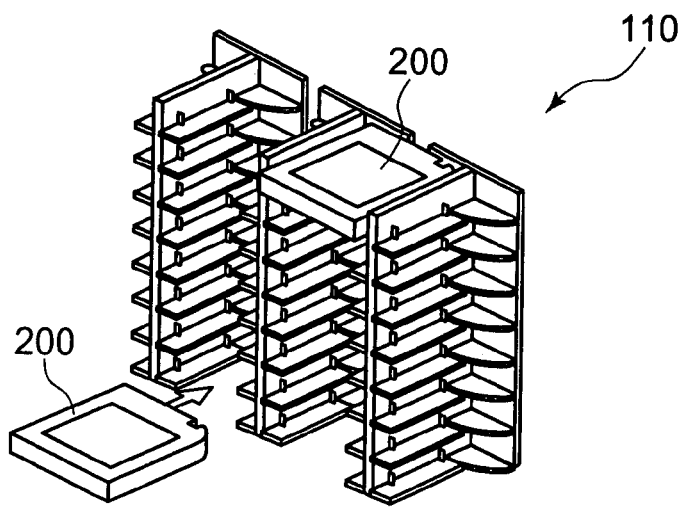
FIG. 1B is a perspective view of a cell which is cut off partially.

Referring to FIG. 1A, the library unit 100 includes two magazines 120 composed of plural cells 110 for loading a tape cartridge, respectively; a magnetic tape drive 130 for reading data from or writing data to a recording medium (magnetic tape) in each cartridge; and an accessor 140 which gives each tape cartridge to the magazine 120 or the magnetic tape drive 130, and receives each tape cartridge from the magazine 120 or the magnetic tape drive 130. The plural tape cartridges are loaded in the cells 110, respectively, so as to be stacked horizontally. FIG. 1B shows a perspective view of a partially cut-off cell 110 of a magazine 120.

The accessor 140 can move freely into the depth (X direction) of the library unit 100. The accessor 140 has functions for giving and receiving each tape cartridge between the magazines 120 and the magnetic tape drive 130 and between the two magazines 120. A magazine 120 is moved in the X direction to be loaded in or unloaded from the library unit 100.

The library unit 100 has plural sensors at its internal wall. According to the detection result of each of the sensors, it is possible to determine a position of each cell 110 of a magazine 120 pulled out halfway from the library unit 100. The position for attaching each of the sensors and how the sensor detects a position of each cell will be described in detail later.

The library unit 100 has an internal plane 101 that is in parallel to a direction for attaching or removing itself 100 and adjacent to each magazine 120. Plural locking mechanisms are provided on the internal plane 101. When a magazine 120 is pulled out halfway from the library unit 100, plural locking mechanisms are turned on or off according to the position of the magazine 120. The height of the internal plane 101 may be free as long as it does not disturb the accessor 140 to access each cell 110. The locking mechanism will be described in detail later. The magnetic tape drive 130 is controlled by a drive controller 131 (not shown).

Figure 2:
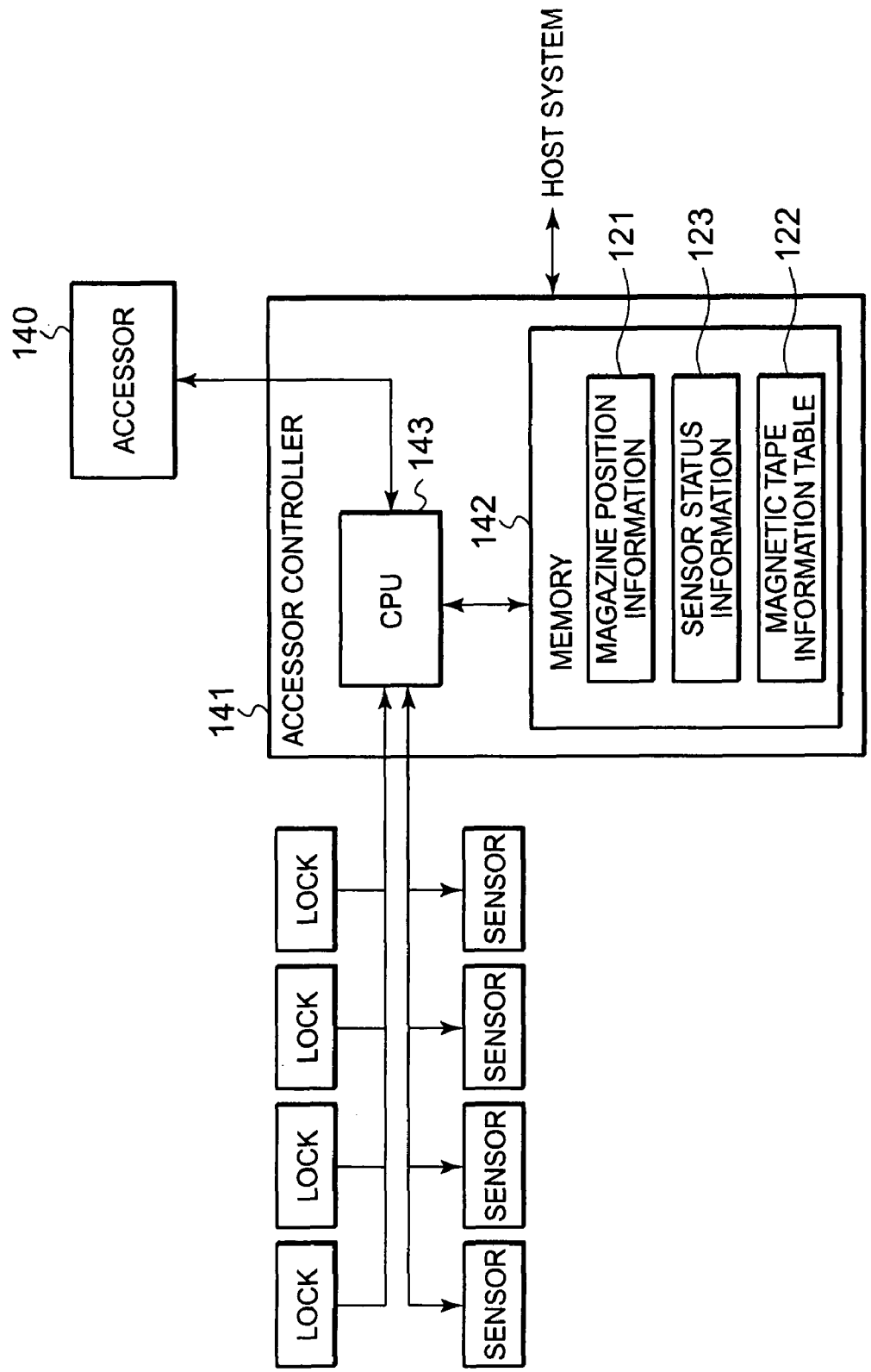
FIG. 2 is a block diagram of an accessor controller in the first exemplary embodiment.

As shown in FIG. 2, the accessor 140 is controlled by an accessor controller 141. The accessor controller 141 includes a CPU 143 and a memory 142. The memory 142 stores magazine position information 121, a magnetic tape information table 122, and sensor status information 123. The magazine position information 121 shows the position status of each magazine pulled out from the library unit 100. The sensor status information table 123 shows a relationship between the ON/OFF information of each of the sensors of the library unit 100 and the position status of each magazine.

The magnetic tape information table 122 stores the correspondence between addresses of cells 110 and magnetic tape drives 130 and magnetic tape identification information. The information is used to determine the position of each cell 110 of a pulled-out magazine. The magazine position information 121, the magnetic tape information table 122, and the sensor status information 123 will be described in detail later.

When a magazine 120 is pulled out halfway from the library unit 100, the locking mechanism is turned on or off according to the position of the magazine 120. Receiving the locking mechanism on or off information, the CPU 143 of the accessor controller 141 activates the sensors only when the locking mechanism is turned on. Receiving the detected sensor on or off information, the CPU 143 refers to the sensor status information 123 to identify the magazine position status. Then, the CPU 143 updates the magnetic tape information table 122 automatically.

When the magnetic tape identification information is specified by such a host system as a host computer, the CPU 143 of the accessor controller 141 refers to the magnetic tape information table 122 to identify the address of the cell 110 in which the magnetic tape specified by the magnetic tape identification information is loaded. Then the CPU 143 controls the accessor 140.

In many cases, a label (VOL) is written in the first data block of each magnetic tape. The label (VOL) identifies the magnetic tape. The identification information used in this exemplary embodiment means such a label (VOL).

The library unit 100 of the present invention may include two or more magnetic tape drives 130. In this case, the library unit 100 can also have functions for giving and receiving tape cartridges between or among those tape drives 130.

The library unit 100 of the present invention may also have three or more magazines 120.

The library unit 100 of the present invention may also have two or more accessors 140.

Figure 3A:
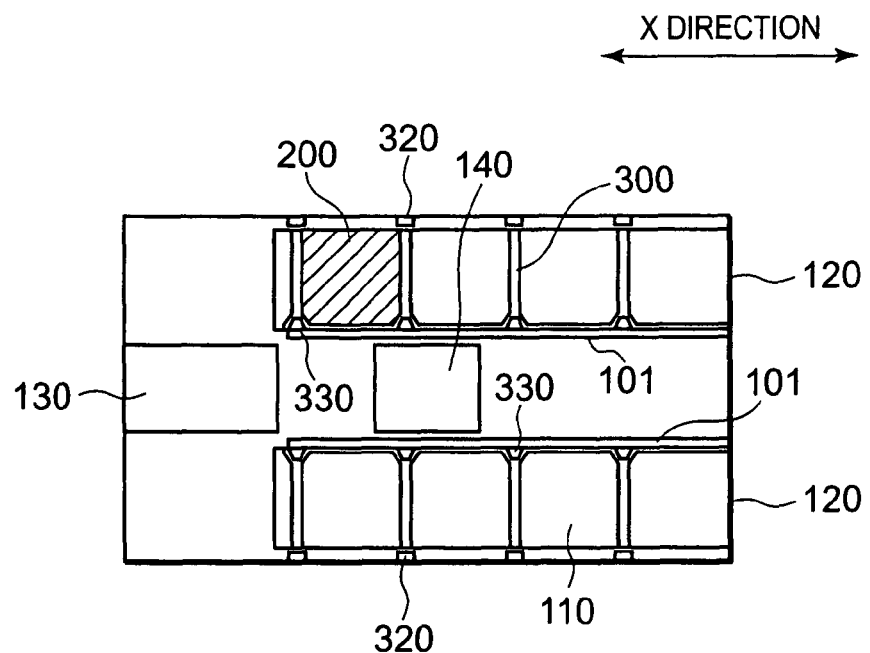
FIGS. 3A and 3B are top views of the magnetic tape library unit in the first and second exemplary embodiments of the present invention.
Figure 3B:
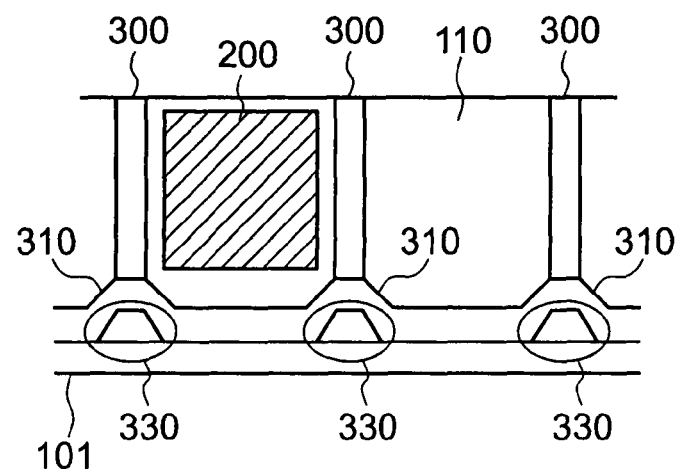

Referring to FIG. 3A, each magazine 120 has a partition 300 for partitioning each cell 110 from another in the row direction. And a notch 310 is provided at the bottom board at each partition 300 of each magazine 120. The notch 310 is shaped as a trapezoid having a short side at the partition side. The partition 300 may be provided only between cells 110 without being provided at an end of the magazine 120.

A sensor 320 is provided at a position on the inner wall of the library unit 100 so as to face the partition 300 when the magazine 120 is loaded in the library unit 100. The sensor 320 is a reflection type photosensor and includes a light emission part and a light receiving part. If a magazine 120 is positioned facing the sensor 320, the light emitted from the light emission part is reflected by the magazine 120 and the reflected light is received by the light receiving part. When the receiving part of the sensor 320 receives a reflected light, the accessor controller 141 confirms the existence of a magazine 120 at a position facing the sensor 320 and stores the information in the memory 142. And a locking mechanism 330 is provided on the internal plane 101 of the library unit 100 of the present invention. The locking mechanism 330 fixes the accessor 140 at a position where the accessor 140 can access a target cell 110 when the magazine 120 is to be pulled out in the X direction.

FIG. 4 shows a perspective view of the locking mechanism 330 of the library unit 100 of the exemplary embodiment. The locking mechanism 330 is a momentary type one and is turned on or off when the projection 400 is moved in the Y direction. The projection 400 is shaped as a trapezoid which has a short side at the contact side with the magazine 120 and has a long side at the side of the internal plane. The projection 400 is fit in a notch 310 of the magazine 120. Because the projection 400 is shaped as a trapezoid (not a rectangle), the locking mechanism 330 is turned on or off more easily when the magazine 120 is pulled out in the X direction.

Figures 4A, 4B:
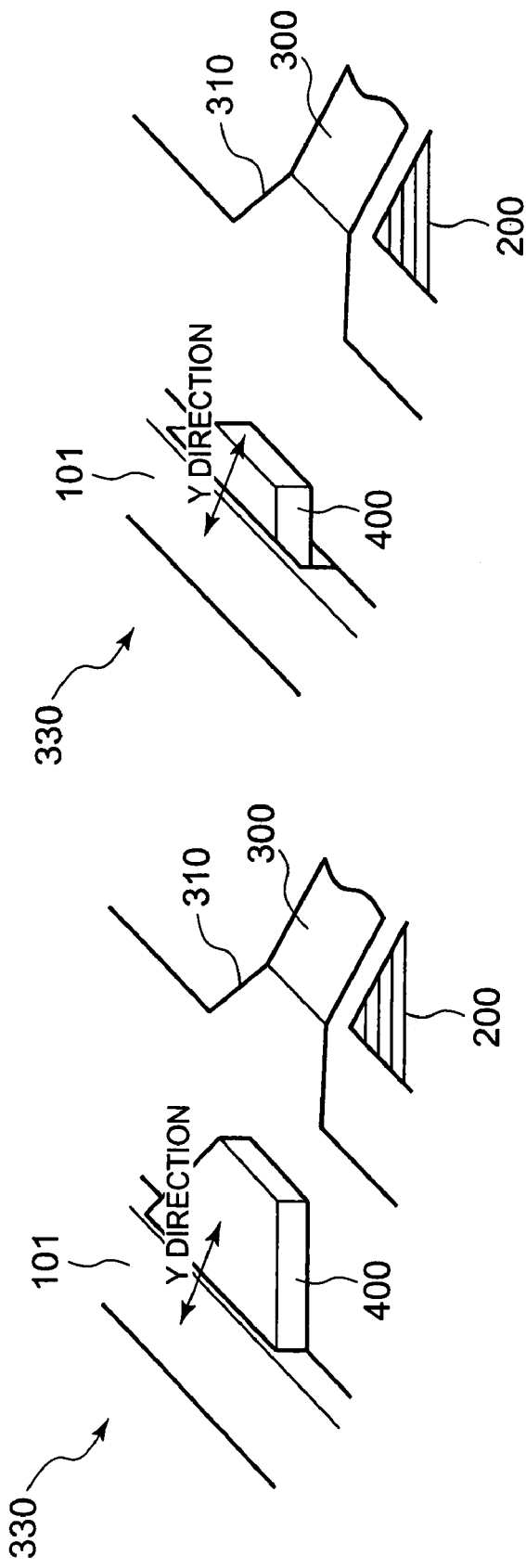
FIGS. 4A and 4B is a perspective view of a locking mechanism of the magnetic tape library unit in the first and second exemplary embodiments of the present invention.

When the projection 400 comes to face a notch 310 of the magazine 120 which is pulled out in the X direction, the projection 400 protrudes as shown in FIG. 4A and the locking mechanism 330 begins to work. On the other hand, in case where the projection 400 does not face a notch 310 of the magazine 120, the projection 400 is pressed down onto a side surface of the bottom board of the magazine 120 as shown in FIG. 4B and the locking mechanism does not work at this time.

The projection 400 and the notch 310 of the magazine 120 may not be shaped as trapezoids; they may be shaped freely if they are almost similar in shape and the locking mechanism 330 is turned on or off when the magazine 120 is pulled out.

FIG. 5 shows the operation of the library unit 100 when a magazine is pulled out in the X direction. In this first exemplary embodiment, cartridges 200 and 201 are loaded in the cells 111 and 114, respectively.

Figure 5A:
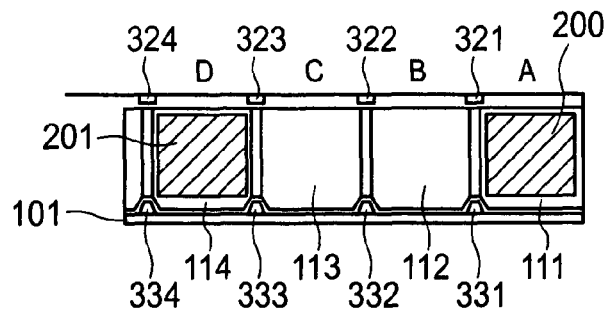
FIGS. 5A through 5D illustrate the operation of the magnetic tape library unit in the first and second exemplary embodiments of the present invention.

As shown in FIG. 5A, when a magazine 120 is loaded in the library unit 100, the projections of the locking mechanisms 331 to 334 are protruded and fit in the notches 310 of the magazine 120.

Figure 5B:
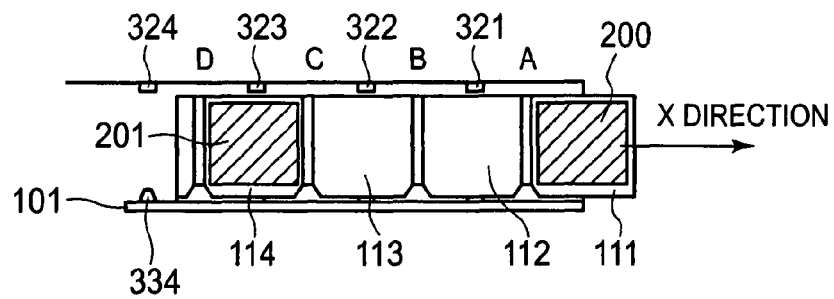

As shown in FIG. 5B, when a tape cartridge 200 is taken out from the cell 111, the magazine 120 is pulled out in the X direction. And when it begins to pull out the magazine 120, the projections 400 of the protruded locking mechanisms 331 to 333 are pressed down onto a side surface of the magazine 120.

Figure 5C:
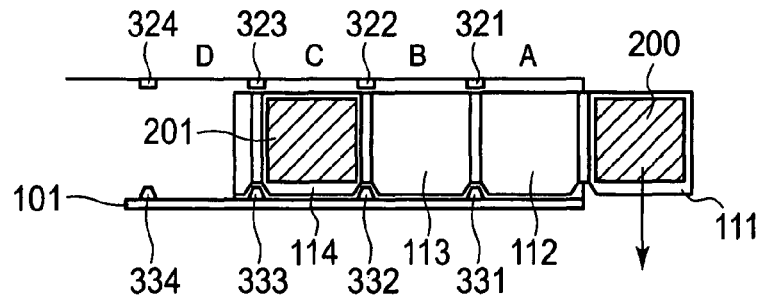

As Shown in FIG. 5C, because the locking mechanisms 331 to 334 are momentary type ones, the projection 400 of each of the locking mechanisms 331 to 334 protrudes again when it meets the next notch 310 of the magazine 120.

The library unit 100 checks whether or not the light receiving part of each of the sensors 321 to 324 receives a light only when the locking mechanisms 331 to 334 are protruded. More concretely, only when the projection 400 of each of the locking mechanisms 331 to 334 is protruded, each sensor 321 to 324 outputs a signal or a circuit that suppresses the outputs of the sensors 321 to 324 does not suppress those outputs. Each of the sensors 321 to 324 is turned on when the library unit 100 confirms that its light receiving part receives a light (when a magazine 120 is detected) or turned off when the library unit 100 does not confirm that its light receiving part receives a light (when a magazine 120 is not detected).

When a magazine 120 is pulled out and sensor ON or OFF information is detected, the library unit 100 refers to the sensor status information 123 to identify the position status of the magazine 120. And accordingly, the magnetic tape information table 122 is updated automatically, thereby the position of the target cell is determined when the magazine 120 is pulled out.

In FIG. 5A, all the sensors 321 to 324 are turned on. And if a magazine 120 is positioned as shown in FIG. 5B, the library unit 100 does not check the status of each sensor 321 to 324. This is because the projection 400 of each locking mechanism is not protruded at that time. And when the magazine 120 is positioned as shown in FIG. 5C, the projection 400 of each locking mechanism 331 to 334 is protruded again. Thus the library unit 100 checks the position of the status of each sensor 321 to 324 to determine the position of the magazine 120. In this case, it is detected that the sensors 321 to 323 are turned on and the sensor 324 is turned off. After this, the magnetic tape information table 122 is updated automatically and the library unit 100 recognizes that the cells 112 to 114 are positioned where the cells 111 to 113 have been positioned respectively before the magazine is pulled out.

And when the magazine is pulled out and the cells 112 and 113 come out from the magazine 120 completely (FIG. 5D), the projection 400 of each locking mechanism 331 to 334 is protruded again. Thus the library unit 100 checks the status of each sensor 321 to 324. In this case, the sensors 323 and 324 are turned off and the sensors 321 and 322 are turned on. After this, the magnetic tape information table 122 is updated automatically and the library unit 100 recognizes that the cells 113 and 114 are positioned where the cells 111 and 112 have been positioned respectively before the magazine 120 is pulled out.

Next, a description will be made in detail for the magazine position information 121, the sensor status information 123, and the magnetic tape information table 122 shown in FIG. 5. Here, it is assumed that the positions of the cells 111 to 114 are represented as A and E when a magazine 120 is loaded in the library unit 100 (FIG. 5A).

The library unit 100 estimates all the possible positions of a magazine 120 to be pulled out beforehand and stores those positions as magazine position information 121 in the memory 142 of the accessor controller 140. FIG. 6A shows the contents of the magazine position information table 121. Status 1 indicates a case in which the cell 111 is loaded in A, the cell 112 is loaded in B, the cell 113 is loaded in C, and the cell 114 is loaded in D, respectively. Status 2 indicates a case in which the cell is loaded in A, the cell 113 is loaded in B, the cell 114 is loaded in C, respectively. Status 3 indicates a case in which the cell 113 is loaded in A and the cell 114 is loaded in B, respectively. And status 4 indicates a case in which the cell 113 is loaded in A.

Figure 5D:
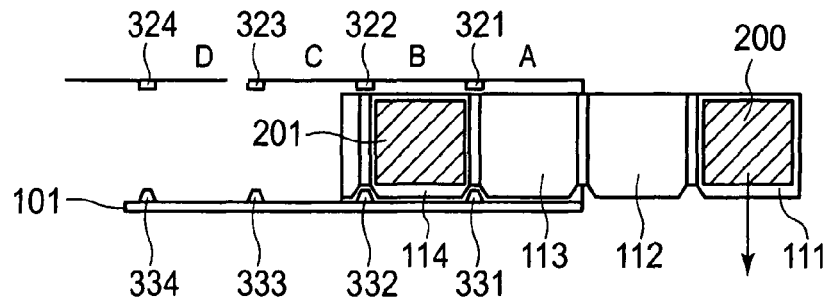

The library unit 100 finds a relationship between the ON or OFF information of sensors and the statuses 1 to 4 in magazine position information 121 beforehand and stores the relationship as the sensor status information 123 in the memory 142 of the accessor controller 140. FIG. 6B shows the contents of the sensor status information 123. The status 1 indicates a case in which all the sensors 321 to 324 are turned on (FIG. 5A). The status 2 indicates that the sensors 321 to 323 are turned on and the sensor 324 is turned off (FIG. 5C). The status 3 indicates a case in which the sensors 321 and 322 are turned on and the sensors 323 and 324 are turned off (FIG. 5D). And the status 4 indicates a case in which only the sensor 321 is turned on and the sensors 322 to 324 are turned off.

The magazine position information 121 and the sensor status information 123 are usually found and stored in the memory 142 when a magazine 120 is loaded in the library unit 100 for the first time.

When the magazine 120 is pulled out from the library unit 100 and the ON/OFF information of the sensors 321 to 324 is changed, the accessor controller 141 refers to the sensor status information 123 to recognize the position status of the magazine 120. And accordingly, the magnetic tape information table 122 is updated automatically.

FIG. 7A through FIG. 7D show the contents of the magnetic tape information table 122 in the statuses 1 to 4, respectively.

The magnetic tape information table 122 is composed of plural records and the number of records is equal to a total (m+n) of the number of magnetic tape drives (m) and the number of cells (n) provided in the library unit 100. Each record includes fields 700 to 702. The field 700 stores cell or magnetic tape drive numbers. The field 701 stores identification information of the magnetic tapes loaded in the cells 110 or magnetic tape drives 130. The field 702 stores addresses to be accessed by the accessor 140. The identification information 200A indicates the identification information of a magnetic tape loaded in a cartridge 200 shown in FIG. 5. The identification information 201A indicates the identification information of a magnetic tape loaded in the cartridge 201 shown in FIG. 5. The addresses 1 to 4 are equivalent to D to A shown in FIG. 5. The address 5 indicates an address of a magnetic tape drive 130 to be accessed by the accessor 140. When no magnetic tape is loaded in any cell, the identification information field 701 is blank. In case where a magazine 120 is pulled out and the accessor 140 is disabled to access the cell 110, the address field 702 is blank. In other words, in case where the address field 702 corresponding to the identification information specified by a host system is blank, the accessor 140 cannot access the target tape cartridge (magnetic tape).

In the status 1 shown in FIG. 7A, when the identification information 201A is specified by the host system, the accessor controller 141 controls so that the accessor 140 accesses the address 1. On the other hand, when the identification information 200A is specified by the host system, the accessor controller 141 controls so that the accessor 140 accesses the address 4.

When the status of the magazine position is shifted to the status 2, the magnetic tape information table 122 is updated automatically as shown in FIG. 7B. At this time, only the address field 702 is updated. When the identification information 201A is specified by the host system, the accessor controller 141 controls so that the accessor 140 accesses the address 2. Even if the identification information 200A is specified by the host system, the accessor cannot access any address. This is because the address field 702 is blank.

When the status of the magazine position is shifted to the status 3, the magnetic tape information table 122 is updated automatically as shown in FIG. 7C. When the identification information 201A is specified by the host system, the accessor controller 141 controls so that the accessor 140 accesses the address 3. If the identification information 200A is specified by the host system, the accessor 140 cannot access any address. This is because the address field 702 is blank.

When the magazine position is shifted to the status 4, the magnetic tape information table 122 is updated automatically as shown in FIG. 7D. When the identification information 201A is specified by the host system, the accessor controller 141 controls so that the accessor 140 accesses the address 4. Because the address field 702 is blank, the accessor 140 cannot access any address even if the identification information 200A is specified by the host system.

If the accessor 140 cannot be access the target cell 110, the accessor controller 141 notifies the host system of the fact as an error.

Next, a description will be made for the automatic updating of the magnetic tape information table 122 when the tape cartridges 200 and 201 are moved by the accessor 140. When the tape cartridges 200 and 201 are moved to different positions, the identification information field 701 is updated in accordance with the new positions (cell or drive numbers). For example, in the state 1, when the accessor 140 moves the cartridge 201 from the cell 114 to the cell 113, the magnetic tape information table 122 is updated automatically as shown in FIG. 8A. When the accessor 140 moves the cartridge 200 from the cell 111 to the drive 130 in the state 1, the magnetic tape information table 122 is updated automatically as shown in FIG. 8B.

In such a way, the library unit in the first exemplary embodiment of the present invention can determine the position of the magazine 120 even when the magazine is pulled out halfway, thereby the accessor 140 can access the cell 110 left in the magazine 120 pulled out halfway in the library unit 100. Thus the target tape cartridge can be given and received by the accessor 140 even when the magazine 120 is pulled out halfway.

Next, a second exemplary embodiment of the present invention will be described in detail.

In the first exemplary embodiment, the library unit 100 specifies magnetic tape identification information. In this second exemplary embodiment, the library unit 100 specifies the address (physical address) of each cell 110 directly.

Figures 9, 10:
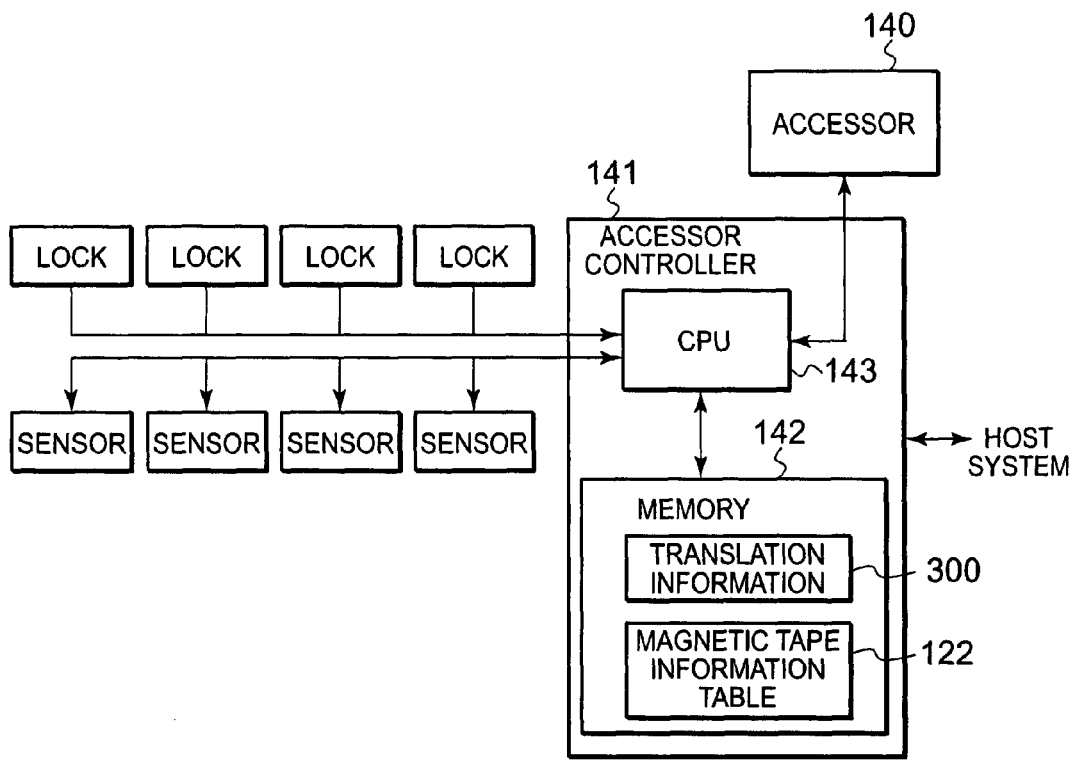
FIG. 9 is a block diagram of the accessor controller in the second exemplary embodiment of the present invention.
FIG. 10 shows how address information is translated in the second exemplary embodiment of the present invention.
Figure 11:
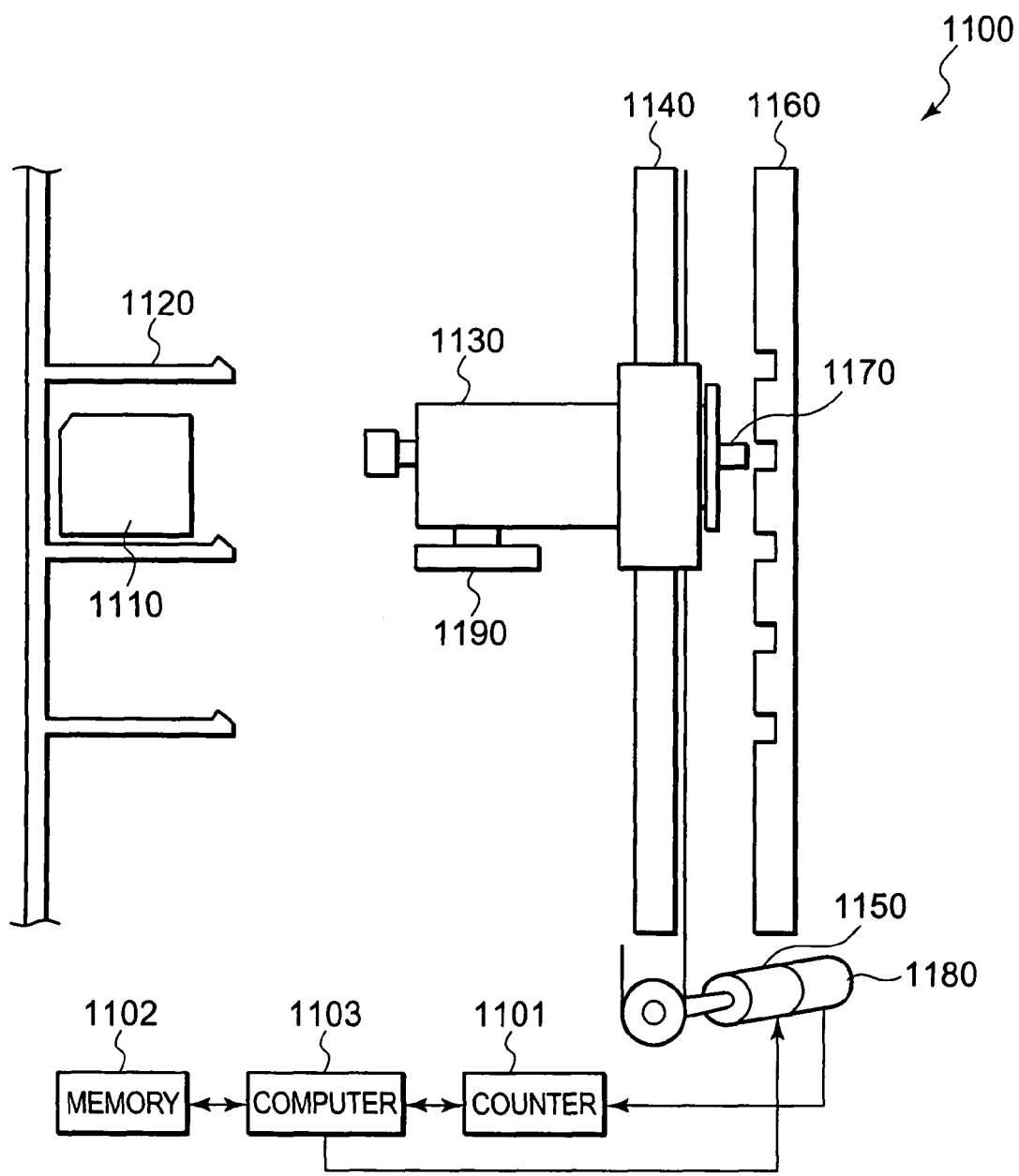
FIG. 11 is a block diagram of a related magnetic tape library unit.

In the library unit in this second exemplary embodiment, only the configuration of the accessor controller 141 is different from that in the first exemplary embodiment. Other configuration items are the same in both first and second exemplary embodiments. FIG. 9 shows a block diagram of an accessor controller in this second exemplary embodiment. The memory 142 of the accessor controller 141 in this second exemplary embodiment stores the magnetic tape information table 122 just like in the first exemplary embodiment. The memory 142 also stores an address translation algorithm corresponding to the number of ON or OFF-status sensors 320 as translation information 900. The memory 142 does not store any of the magazine position information 121 and the sensor status information 123, however.

Next, the translation information table 900 will be described with reference to the cases shown in FIG. 5. As shown in FIG. 10, the translation information 900 includes field 901 to 903. The field 901 indicates the fluctuation number of the ON-status sensors and the field 902 indicates the fluctuation number of OFF-status sensors. The field 903 indicates address translation. Here, the address of a cell n is defined as n and the smaller the n number is, the more the cell 100 is loaded in the depth of the library unit 100. Address translation to be made at a change of the detected sensor status can use either the field 901 or 902. In the following description, the field 901 indicating the fluctuation number of detected ON-status sensors is used as an example. The information obtained by using the field 902 indicating the fluctuation number of detected OFF-status sensors is shown in parentheses.

In the case of the library unit 100 shown in FIG. 5, when the fluctuation number of detected ON-status sensors decreases by one (the number of detected OFF-status sensors increases by one), the magazine 120 is pulled out by a one-cell distance from the library unit 100. In this case, the address translation field 903 in the translation information table 900 therefore stores the address n+1 translated from the address n. When the fluctuation number of detected ON-status sensors decreases by two (the number of detected OFF-status sensors increases by two), the magazine 120 is pulled out by a two-cell distance from the library unit 100. In this case, the address translation field 903 in the translation information table 900 therefore stores the address n+2 translated from the address n. When the fluctuation number of detected ON-status sensors decreases by three (the fluctuation number of detected OFF-status sensors increases by three), the magazine 120 is pulled out by a three-cell distance from the library unit 100. In this case, the address translation field 903 in the translation information table 900 therefore stores the address n+3 translated from the address n. When the ON or OFF information of sensors is not changed, the magazine 120 stays in the same position. Thus the address translation field 903 in the translation information table 900 stores information "no address translation".

When the magazine 120 is pulled out and the sensor ON or OFF information is detected, the accessor controller 141 calculates the fluctuation number of detected ON or OFF-state sensors. Then the accessor controller 151 refers to the translation information 900, thereby the magnetic tape information table 122 is updated automatically according to the translation information 900. As a result, it is possible to obtain the same magnetic tape information table 122 as that shown in FIG. 7 in the first exemplary embodiment.

The address translation table 900 in this second exemplary embodiment of the present invention may store either the detected ON-state sensors field or the detected OFF-state sensors field.

As described above, the second exemplary embodiment of the present invention can obtain the same effects as those of the first exemplary embodiment. In other words, even when the magazine 120 is pulled out halfway, the position of the magazine 120 can be identified and the accessor 140 can access any cell 110 left in the magazine 120 pulled out halfway in the library unit 100. Furthermore, in the first exemplary embodiment, all the possible positions of the magazine 120 to be pulled out are estimated beforehand, and the magazine position information 121 and the sensor status information 123 must be stored in the memory 142. In this second embodiment, however, it is just required to store the address translation table 900. Thus the magnetic tape information table 122 can be updated automatically with less memory capacity than in the first exemplary embodiment.

How to identify the position of each cell 110 in a magazine 120 is not limited only to those described in the first and second exemplary embodiments of the present invention. For example, it is possible that the memory 142 of the accessor controller 141 may store both logical address table and physical address table of cells 110 and the library unit 100 specifies the logical address of each cell 110 in which a target cartridge (magnetic tape) is stored. In such a case, the address translation table 900 is updated automatically according to the sensor ON/OFF information. And accordingly, the magnetic tape information table 122 is updated automatically.

Furthermore, while a magnetic tape library unit is picked up in the embodiments of the present invention, another library unit may be employed. The recording medium to be loaded in a cartridge is not limited only to magnetic tape.

Furthermore, although a locking mechanism 330 and a sensor 320 are provided at each partition 300 between cells 110 in the case of the present invention, the number of locking mechanisms 330 and the number of sensors 320 may be specified freely; they are not limited only to those in the exemplary embodiments of the present invention.

Although reflection type photosensors are employed for the magnetic tape library unit of the present invention, the sensors 320 may be separated type photosensors. When such separated type sensors are used, the light receiving part of each sensor 320 is provided on the partition 300 of the magazine 120. However, the light receiving parts may be provided on a side surface of the magazine at equal intervals from the partition 300 provided at both ends of each cell 110. On the other hand, the light receiving part of the sensor 325 is provided on the internal wall of the library unit 102 so as to face the light receiving part of each sensor 320 when the magazine 120 is loaded in the library unit 100.

While this invention has been described in conjunction with the preferred embodiments described above, it will now be possible for those skilled in the art to put this invention into practice in various other manners.

What is claimed is:

1. A library unit, comprising:
 a magazine loaded in said library unit;
 a cartridge which is loaded in said magazine and arranged in a direction in which said magazine is loaded or unloaded;
 at least one sensor provided for said library unit and activated to make an output, when said magazine is pulled out to a position other than a home position, whether or not said magazine is positioned facing said sensor; and
 an accessor which identifies a position of said magazine according to an output of said sensor and which receives said cartridge.

2. The library unit according to claim 1, further comprising:
 an information table indicating a relationship between an output of said sensor and a position of said magazine,
 wherein said accessor is controlled according to an output of said sensor and a relationship indicated in said information table.

3. The library unit according to claim 1, wherein said sensor comprises a reflection type photosensor.

4. The library unit according to claim 1, further comprising:
 a plurality of magazines, wherein said accessor gives and receives said cartridge among said plurality of magazines.

5. The library unit according to claim 1,
 wherein said magazine has a partition between positions at which said cartridges are cartridge is stored, and
 wherein said sensor is positioned to face said partition when said magazine is loaded in said library unit.

6. The library unit according to claim 5, further comprising:
 an information table indicating a relationship between the output of said sensor and the position of said magazine,
 wherein said accessor is controlled according to an output of said sensor and a relationship indicated in said information table.

7. The library unit according to claim 5, wherein said sensor comprises a reflection type photosensor.

8. The library unit according to claim 5, further comprising:
 a plurality of magazines,
 wherein said accessor gives and receives said cartridge among said plurality of magazines.

9. The library unit according to claim 5, further comprising:
 a locking mechanism which locks said magazine when said magazine is pulled out and said partition of said magazine is positioned to face said sensor,
 wherein said sensor detects whether or not said magazine is positioned to face said sensor when said locking mechanism is working.

10. The library unit according to claim 9, further comprising:
 an information table indicating a relationship between the output of said sensor and the position of said magazine,
 wherein said accessor is controlled according to an output of said sensor and a relationship indicated in said information table.

11. The library unit according to claim 9, wherein said sensor comprises a reflection type photosensor.

12. The library unit according to claim 9, further comprising:
 a plurality of magazines,
 wherein said accessor gives and receives said cartridge among said plurality of magazines.

13. The library unit according to claim 9, further comprising:
 an internal plane, which is parallel to said direction in which said magazine is loaded or unloaded, wherein said locking mechanism is provided on said internal plane.

14. The library unit according to claim 13, further comprising:
an information table indicating a relationship between the output of said sensor and the position of said magazine,
wherein said accessor is controlled according to an output of said sensor and a relationship indicated in said information table.

15. The library unit according to claim 13, wherein said sensor comprises a reflection type photosensor.

16. The library unit according to claim 13, further comprising:
a plurality of magazines,
wherein said accessor gives and receives said cartridge among said plurality of magazines.

17. The library unit according to claim 13,
wherein said magazine includes a notch,
wherein said locking mechanism includes a projection to be fit in said notch, and
wherein said projection can move perpendicularly to said internal plane.

18. The library unit according to claim 17, further comprising:
an information table indicating a relationship between the output of said sensor and the position of said magazine,
wherein said accessor is controlled according to an output of said sensor and a relationship indicated in said information table.

19. The library unit according to claim 17, wherein said sensor comprises a reflection type photosensor.

20. The library unit according to claim 17, further comprising:
a plurality of magazines,
wherein said accessor gives and receives said cartridge among said plurality of magazines.

21. The library unit according to claim 17,
wherein said projection is shaped as a trapezoid of which short side is assumed at a side of a surface coming in contact with said magazine and of which long side is assumed at a side of said internal plane.

22. The library unit according to claim 17, wherein said notch is provided for said partition of said magazine.

23. The library unit according to claim 22, further comprising:
an information table indicating a relationship between the output of said sensor and the position of said magazine,
wherein said accessor is controlled according to an output of said sensor and a relationship indicated in said information table.

24. The library unit according to claim 22,
wherein said sensor comprises a reflection type photosensor.

25. The library unit according to claim 22, further comprising:
a plurality of magazines,
wherein said accessor gives and receives said cartridge among said plurality of magazines.

26. The library unit according to claim 22, wherein said projection is shaped as a trapezoid of which short side is assumed at a side of a surface coming in contact with said magazine and of which long side is assumed at a side of said internal plane.

27. The library unit according to claim 1,
wherein said sensor is activated to make an output when said magazine is pulled out halfway from said library unit.

28. The library unit according to claim 1, further comprising;
a locking mechanism which locks said magazine when said magazine is pulled out to the predetermined position, and
wherein said sensor is activated to make an output when the locking mechanism is working.

29. A magazine position detecting method in a library unit which includes a magazine loaded, a cartridge, which is loaded in said magazine and arranged in a direction in which said magazine is loaded/unloaded, at least one sensor, and an accessor for receiving said cartridge, said method comprising:
making an output of whether or not said magazine is positioned to face said sensor by activating an output of said sensor when said magazine is pulled out to a position other than a home position; and
identifying a position of said magazine according to said output of said sensor to access said cartridge.

30. The magazine position detecting method in a library unit according to claim 29,
wherein said library unit further includes an information table indicating a relationship between the output of said sensor and the position of said magazine, said method further comprising:
controlling said accessor according to an output of said sensor and a relationship in said information table.

31. The magazine position detecting method in a library unit according to claim 29,
wherein said library unit includes a plurality of magazines, said method further comprising:
controlling said accessor to gives and receives give and receive said cartridge among said plurality of magazines.

32. The magazine position detecting method in a library unit according to claim 29,
wherein said magazine has a partition between positions in which said cartridges are cartridge is loaded loadable respectively, said sensor is positioned to face said partition when said magazine is loaded in said library unit, and said library unit further includes a locking mechanism for locking said magazine when said magazine is pulled out and said partition of said magazine is positioned to face said sensor, said method further comprising:
detecting whether or not said magazine is positioned to face said sensor when said locking mechanism is working.

33. The magazine position detecting method in a library unit according to claim 32,
wherein said library unit further includes an information table indicating a relationship between the output of said sensor and the position of said magazine, said method further comprising:
controlling said accessor according to an output of said sensor and a relationship in said information table.

34. The magazine position detecting method in a library unit according to claim 32,
wherein said library unit includes a plurality of magazines, said method further comprising:
controlling said accessor to gives and receives give and receive said cartridge among said plurality of magazines.

35. The magazine position detecting method in a library unit according to claim 29,
wherein said making an output is activated when said magazine is pulled out halfway from said library unit.

36. The magazine position detecting method in a library unit according to claim 29, further comprising:
  working a locking mechanism which locks said magazine when said magazine is pulled out to the predetermined position, wherein said sensor is activated to make an output when the locking mechanism is working.

* * * * *